United States Patent [19]
Arita et al.

[11] Patent Number: 4,520,483
[45] Date of Patent: May 28, 1985

[54] SIGNAL DIAGNOSTIC METHOD AND APPARATUS FOR MULTIPLE TRANSMISSION SYSTEM

[75] Inventors: Setsuo Arita; Tetsuo Ito, both of Hitachi, Japan

[73] Assignee: Hitachi, Ltd., Tokyo, Japan

[21] Appl. No.: 421,375

[22] Filed: Sep. 22, 1982

[30] Foreign Application Priority Data

Sep. 28, 1981 [JP] Japan ................. 56-152211

[51] Int. Cl.³ .............................. H04M 3/22
[52] U.S. Cl. ...................... 371/68; 371/1; 375/118
[58] Field of Search ............. 371/68, 1, 56, 57, 61; 375/107, 114, 118, 110, 10

[56] References Cited

U.S. PATENT DOCUMENTS

| | | | |
|---|---|---|---|
| 3,645,516 | 3/1972 | Flinders et al. | 371/68 |
| 3,927,392 | 12/1975 | Caron | 371/68 |
| 3,959,589 | 5/1976 | von Roesgen | 375/118 |
| 4,011,542 | 3/1977 | Baichtal et al. | 371/68 X |
| 4,181,975 | 1/1980 | Jenkins | 375/118 X |
| 4,225,961 | 9/1980 | Raggenbass et al. | 371/68 X |
| 4,255,809 | 3/1981 | Hillman | 371/68 X |
| 4,353,130 | 10/1982 | Carasso et al. | 375/118 X |
| 4,447,903 | 5/1984 | Sewerinson | 371/68 |

*Primary Examiner*—Jerry Smith
*Assistant Examiner*—Michael R. Fleming
*Attorney, Agent, or Firm*—Antonelli, Terry & Wands

[57] ABSTRACT

The present invention relates to a signal diagnostic method for a triple information transmission system. According to this method, using a transmission signal transmitted latest among three transmission signals of three channels, the synchronizing signal parts of the respective transmission signals are synchronized so as to align the heads of information signal parts of the transmission signals, whereupon any error in the information signal parts of the transmission signals is detected. The three transmission signals of the three channels are temporarily stored in three registers. The storage time intervals of the transmission signals in the registers are determined by the transmission time differences between the respective transmission signals and the latest transmission signal. Upon lapse of the predetermined storage time intervals, the transmission signals are fetched from the respective registers.

9 Claims, 16 Drawing Figures

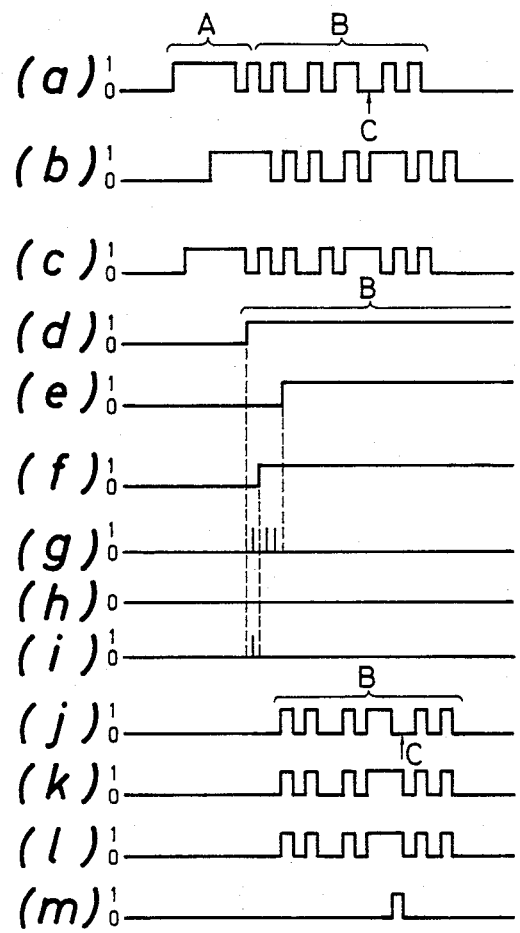

SIGNAL DIAGNOSTIC METHOD AND APPARATUS FOR MULTIPLE TRANSMISSION SYSTEM

BACKGROUND OF THE INVENTION

The present invention relates to a signal diagnostic method and diagnostic apparatus for a multiple information transmission system, and more particularly to a signal diagnostic method and diagnostic apparatus for a multiple information transmission system which are capable of detecting the error of a signal in a short time.

In case of transmitting a large number of information to an equipment located at a remote position, a serial transmission signal-transmitting system is adopted for the purpose of reducing expenses for laying cables for information transmission. A serial transmission signal is composed of a synchronizing signal part A and an information signal part B. The synchronizing signal part A includes a synchronizing signal C and a synchronizing bit D. The serial transmission signal is transmitted as serial information which consists of the synchronizing signal part A and the information signal part B as a unit. In general, in such transmission system, a multiple transmission system with the information transmission system made redundant is adopted for enhancing the reliability of the transmitted information, and a method is adopted in which the presence or absence of an error in any transmission signal transmitted in the multiple transmission system is decided by the comparisons of the respective transmission signals.

An example of a triple information transmission system in a prior art will be described below. A measurement value obtained by a certain detector disposed in a nuclear power plant is transmitted to three juxtaposed transmitters, which convert the measurement value into serial transmission signals respectively. These signals are transmitted to receivers through three transmission lines which are connected to the respective transmitters. The serial transmission signals provided from the three transmitters are stored in memories which are connected to the respective transmitters. After all the serial transmission signals from the transmitters have been stored in the three memories, one or several data is/are loaded from each memory into an error detector so as to sequentially compare the data fetched from the three memories. Owing to this operation, which of the information transmission channels involves an error can be decided.

In the signal diagnosis of such triple information transmission system, after all the serial transmission signals have been entirely stored in the three memories, the transmission signals stored in the respective memories are read out and compared by the error detector. Therefore, the error decision of the transmission signals is late, and the rate of information processing behind the receivers becomes slow.

SUMMARY OF THE INVENTION

An object of the present invention is to detect the error of a transmission signal in a multiple information transmission system in a short time.

Another object of the present invention is to reduce the capacity of a memory for storing a transmission signal.

A characterizing feature of the present invention consists in that a transmission signal transmitted latest is detected from among a plurality of transmission signals which are transmitted in parallel with one another within a plurality of signal transmission means, and that the synchronizing signal part of the transmission signal transmitted latest is used for synchronizing those of the other transmission signals.

BRIEF DESCRIPTION OF THE DRAWINGS

FIG. 3 which is comprised of parts (a)–(m) is an explanatory diagram showing various signal forms in the information-signal diagnostic apparatus shown in FIG. 1.

DESCRIPTION OF THE PREFERRED EMBODIMENTS

Figure 1:
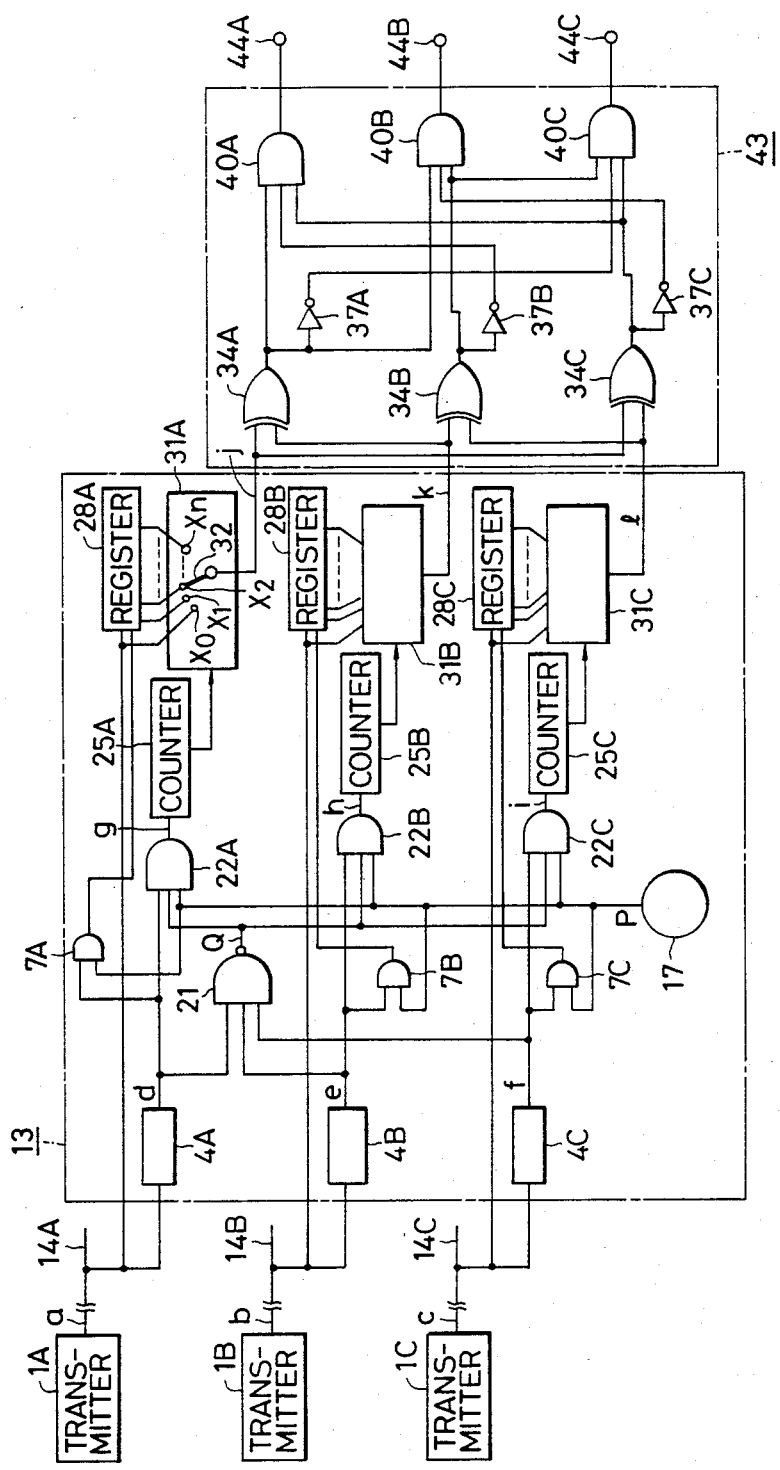
FIG. 1 is a block diagram of a signal diagnostic apparatus for a multiple transmission system which is a preferred embodiment of the present invention.
Figure 2:
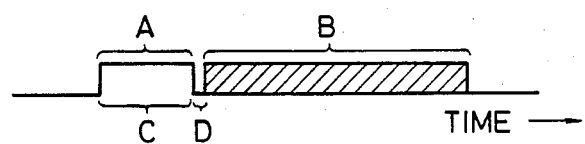
FIG. 2 is an explanatory diagram of a serial transmission signal for use in the multiple transmission system in FIG. 1.

A preferred embodiment of the present invention will be described with reference to FIG. 1. A triple information transmission system, in which the measurement signals of respective detectors installed in a plant, e.g., a nuclear power plant are transmitted to a control center, operates so that the measurement signals of the corresponding detectors are sent to three juxtaposed transmitters 1A, 1B and 1C and are respectively converted therein into serial transmission signals as shown in FIG. 2, and that the serial transmission signals are separately transmitted to three receivers, not shown, installed in the control center through transmission lines 14A, 14B and 14C which are respectively connected to the transmitters 1A, 1B and 1C. The serial transmission signal shown in FIG. 2 consists of a synchronizing signal part A and an information signal part B. The synchronizing signal part A includes a synchronizing signal C and a synchronizing bit D.

An information-signal diagnostic apparatus is connected to the respective transmission lines 14A, 14B and 14C. The information-signal diagnostic apparatus is constructed of a signal synchronizing device 13 and an error detecting circuit 43. The signal synchronizing device 13 includes synchronizing signal part-detecting circuits 4A, 4B and 4C, a clock signal generator 17, a NAND gate 21, AND gates 22A, 22B and 22C and counters 25A, 25B and 25C, all of which constitute signal lag detecting means, and registers 28A, 28B and 28C which constitute signal delaying means.

Upon receiving the measurement signals of the detectors of the nuclear power plant, the transmitters 1A, 1B and 1C deliver signals (a), (b) and (c) shown in FIG. 3, which are serial transmission signals, respectively. In order to facilitate synchronism in the receivers, the transmitters 1A, 1B and 1C are provided with clock signal generators (for example, crystal oscillators). Clock pulses (having equal periods) from the clock signal generators are respectively contained in the signals (a), (b) and (c). Any of the signals (a), (b) and (c) delivered from the respective transmitters lags as shown in FIG. 3, for the reasons that the clock signal generators provided in the transmitters 1A, 1B and 1C are difficult to be mutually synchronized in relation to attaining redundancy and that the constants of the circuits of the respective transmitters are unequal. In the example of FIG. 3, the signals (c) and (d) involve the lags. The signals (a), (b) and (c) are transmitted asynchronously to one another.

The signals (a), (b) and (c) are applied to the three receivers (not shown) of the control center, the synchronizing signal part-detecting circuits 4A, 4B and 4C, and the registers 28A, 28B and 28C, respectively. All these registers are shift registers. Upon receiving the signals (a), (b) and (c), the synchronizing signal part-detecting circuits 4A, 4B and 4C deliver signals (d), (e) and (f) shown in FIG. 3. The signal (d) is applied to the NAND gate 21 and AND gates 7A and 22A. The signal (e) is applied to the NAND gate 21 and AND gates 7B and 22B. The signal (f) is applied to the NAND gate 21 and AND gates 7C and 22C. The NAND gate 21 provides "0" when the information signal parts B of all the signals (d), (e) and (f) have been received, that is, when the whole synchronizing signal part A of the latest one of all the signals has been received, while it provides "1" when any of the signals (d), (e) and (f) does not have its information part B applied, that is, when any of the signals does not have the application of its synchronizing signal part A ended. Thus, the NAND gate 21 detects the latest signal among the plurality of serial transmission signals.

Clock pulses P provided from the clock signal generator 17 are respectively applied to the AND gates 7A, 7B, 7C, 22A, 22B and 22C. The clock pulses P have the same period as the clock pulses which are the outputs of the respective clock signal generators disposed in the transmitters 1A, 1B and 1C.

The AND gates 22A, 22B and 22C receive the corresponding signals (d), (e) and (f), the clock pulse P, and the output signal Q of the NAND gate 21. They provide "1" when the output signal Q is "1", the corresponding signals (d), (e) and (f) have become the information signal parts B and the clock pulse has become "1". This will be described in detail with reference to FIG. 3. The AND gate 22A provides a pulsatile signal (g) shown in FIG. 3, in correspondence with the clock pulses P when the output signal Q is "1" and the information signal part B of the signal (d) is being received. The AND gate 22C provides a pulsatile signal (i) in correspondence with the clock pulse P when the output signal Q is "1" and the information signal part B of the signal (f) is being received. Regarding the AND gate 22B, since the signal (b) is the latest, the output Q becomes "0" when the information signal part B of the signal (e) has been received. Therefore, this AND gate does not provide any pulse signal corresponding to the clock pulse P, and its output is "0" at all times as in a signal (h).

The signals (g), (h) and (i), which are the output signals of the AND gates 22A, 22B and 22C, are respectively applied to the counters 25A, 25B and 25C. The respective counters count the numbers of pulses of the received signals (g), (h) and (i). The counters 25A, 25B and 25C inform change-over switches 31A, 31B and 31C of the numbers of counted pulses, respectively. The numbers of pulses counted by the respective counters 25A and 25C are multiplied by the time interval of the period of the clock pulses P, thereby to find the respective transmission time differences between the signals (a) and (c) and the signal (b) of the greatest lag which is applied to the AND gate 22B and as to which the number of pulses is not counted. The numbers of pulses counted by the counters indicate the transmission time differences.

The concrete structure of the change-over switch will be described in conjunction with the change-over switch 31A. The change-over switch 31A has a rotary switch 32, and $(n+1)$ input terminals $X_0$, $X_1$, ... and $X_n$. Further, the change-over switch 31A has a decoder which moves the rotary switch 32 in accordance with the number of pulses being the output of the counter, though the decoder is not shown. The input terminal $X_0$ is connected to a path for holding the transmitter 1A and the register 28A in communication, while bypassing this register. The other input terminals $X_1 - X_n$ are connected to the register 28A. The input terminal of larger suffix No. is connected to the upper digit of the register.

The rotary switch 32 of each change-over switch is connected to the input terminal $X_0$ at first. When the number of pulses from the counter 25A is entered into the change-over switch 31A, the rotary switch 32 is rotated clockwise by the number of pulses under the action of the decoder. Since, in the present embodiment, three pulses are provided from the counter 25A, the rotary switch 32 of the change-over switch 31A is rotated to the third input terminal $X_3$ as reckoned from the input terminal $X_0$. Since quite no pulse is provided from the counter 25B, the rotary switch 32 of the change-over switch 31B does not move and remains connected to the input terminal $X_0$. In addition, since one pulse is provided from the counter 25C, the rotary switch 32 of the change-over switch 31C is rotated to the first input terminal $X_1$ as reckoned from the input terminal $X_0$. The structure and operation of the change-over switch 31B or 31C are the same as those of the change-over switch 31A.

Upon receiving the corresponding signals (d), (e) and (f) and the clock pulse P, the AND gates 7A, 7B and 7C supply the respective registers 28A, 28B and 28C with clock pulses so as to load only the information signal parts B of the signals (a), (b) and (c) into these registers.

The registers 28A, 28B and 28C are shift registers, which have the function of temporarily accumulating (storing) the serial transmission signals and which are a kind of delaying means. Here, the register length (the memory capacity) $\alpha$ of the register 28A, 28B or 28C is determined by the following equation:

$$\alpha \geq T_o/T_s \qquad (1)$$

where $T_o$ denotes the maximum lag time between the adjacent serial transmission signals delivered from each transmitter 1A, 1B or 1C, and $T_s$ denotes the period of the clock pulses P provided from the clock signal generator 17.

The register length $\alpha$ of each register 28A, 28B or 28C is made the minimum bit arrangement as indicated by $\alpha = T_o/T_s$. Since the period of the clock pulses P is equal to that of the clock pulses of the clock signal generator disposed in each transmitter 1A, 1B or 1C, the register length $\alpha$ exhibits an integral value.

Since the registers 28A, 28B and 28C have the register lengths $\alpha$ corresponding to the maximum lag times of the signals (a), (b) and (c), the register lengths $\alpha$ increase as the synchronism of the respective signals extends. In order to make the register lengths $\alpha$ less than a prescribed value, accordingly, it is necessary to synchronize the transmitters 1A, 1B and 1C in transmitting information.

When, in the state in which the rotary switches 32 of the change-over switches 31A, 31B and 31C are respectively connected to the input terminals $X_3$, $X_o$ and $X_1$ as described before, the signals (a), (b) and (c) are applied to the corresponding registers 28A, 28B and 28C, the respective registers deliver signals (j), (k) and (l) that are in the state in which the heads of the information signal parts B of the signals (a), (b) and (c) are aligned as shown in FIG. 3. The register for receiving the signal which is transmitted earliest among the signals (a), (b) and (c), has its rotary switch 32 connected to the upper digit and functions to temporarily store and delay the earliest transmitted signal for a time interval which corresponds to the lag time between this signal and the latest one of the aforementioned three signals. In the present embodiment, the delay time of the signal (a) in the register 28A is the longest, and the delay time of the signal (b) is null. As the signal lags more behind the aforesaid signal transmitted earliest, the corresponding register has the lower digit selected by its rotary switch 32, and the delay time of the particular signal becomes shorter. The time at which the transmission signals are derived from the registers can be adjusted by controlling the delay times in the respective registers in this manner. The AND gates 22A, 22B and 22C and the counters 25A, 25B and 25C detect the time differences between the latest signal and the other signals, namely, the time intervals during which the signals are delayed by the registers. The change-over switches are means which receive the output signals of the signal delay time-detecting means and which adjust the signal delay times in the registers acting as the delaying means.

The signals (j), (k) and (l), which are concurrently provided from the registers 28A, 28B and 28C, are applied to the error detecting circuit 43. The error detecting circuit 43 compares the signals (j), (k) and (l), and judges the presence or absence of any error in these signals. In the presence of an error in any signal, the circuit 43 provides a signal to that effect. This signal is applied to the receiver, not shown, so that the serial transmission signal in which the error is involved is prevented from entering the receiver. The normal serial transmission signals transmitted by the remaining channels are applied to the receivers, and are used for the control of an equipment etc.

An example of the error detecting circuit 43 will be described with reference to FIG. 1. The error detecting circuit 43 includes EOR gates 34A, 34B and 34C, NOT gates 37A, 37B and 37C, and AND gates 40A, 40B and 40C. The signal (j) which is the output signal of the register 28A is transmitted to the EOR gates 34A and 34C. The signal (k) which is provided from the register 28B is applied to the EOR gates 34A and 34B. Further, the signal (l) which is the output of the register 28C is transmitted to the EOR gates 34B and 34C. An output from the EOR gate 34A is transmitted to the AND gates 40A and 40B, and also to the AND gate 40C through the NOT gate 37A. An output from the EOR gate 34B is transmitted to the AND gates 40B and 40C, and also to the AND gate 40A through the NOT gate 37B. Lastly, an output from the EOR gate 34C is transmitted to the AND gates 40A and 40C and also to the AND gate 40B through the NOT gate 37C. Outputs from the AND gates 40A, 40B and 40C are respectively sent to the three receivers through output terminals 44A, 44B and 44C.

The operation of the error detecting circuit 43 will be concretely described by referring to the signals shown in FIG. 3. In the triple information transmission system, one information is transmitted in triple fashion, and hence, the signals transmitted by the three channels will be the same if the transmitters of the respective channels are normally functioning. However, in a case where the transmitter of one channel has gotten out of order or where a primary disturbance has entered, the transmission signal of the particular channel is disturbed and becomes different from the transmission signals of the other channels. By way of example, it is assumed that an error is involved in the C part of the signal (a). Although parts corresponding to the C parts of the other signals (b) and (c) are of "1", the C part of the signal (a) is of "0".

When supplied with the C parts of the signals (j), (k) and (l) corresponding to the signals (a), (b) and (c), the EOR gates 34A, 34B and 34C provide "1", "0" and "1", respectively. The NOT gate 37A provides "0", the NOT gate 37B "1", and the NOT gate 37C "0". Since only the AND gate 40A receives three input signals of "1", it provides a signal (m) which has a pulse of "1" in the C part as shown in FIG. 3. The other AND gates 40B and 40C provide "0". It is accordingly understood that the error exists in the signal (a) provided by the transmitter 1A.

According to the present embodiment, among the serial transmission signals of the plurality of channels transmitted asynchronously, the serial transmission signal lagging most has its synchronizing signal part used for synchronizing the synchronizing signal parts of the other serial transmission signals transmitted earlier, so that any error of the information signal parts of the respective serial transmission signals can be detected during the transmission of the serial synchronizing signals. Accordingly, the error of the serial transmission signal in the multiple information transmission system can be detected in a short time. This leads to enhancement in the reliability of the multiple information transmission system, and also leads to quickening the time at which information processing in the receivers starts, thereby to complete the information processing fast. The present embodiment can detect the error of the transmission signal being transmitted, unlike the prior-art example which detects any error of serial transmission signals after all the transmission signals have been entirely stored in the memories of a computer.

In addition, the present embodiment may only be provided with the registers for temporarily delaying the information signal parts partially, without requiring any memory adapted to store all the serial transmission signals. Therefore, the construction of the multiple information transmission system itself can be simplified remarkably. The number of necessary components can be made sufficiently small, and the reliability of the transmission system can be enhanced also from this viewpoint.

In order to prevent any trouble of the information-signal diagnostic apparatus from affecting the signal transmission system, which is normally transmitting information, and then hampering the normal information transmission, optical transmission cables are used as the transmission lines 14A, 14B and 14C. Moreover, insulating the signal transmission system and the information-signal diagnostic apparatus is permitted by connecting an optical branch unit to the cables and distributively receiving the optical transmission signals. The optical cables and optical branch unit mentioned above may well be replaced with electric wires and an insulating transformer.

While the triple information transmission system has been described above, the same applies to other multiple information transmission systems. In this regard, however, the output of the error detecting circuit in a double information transmission system indicates that an error exits in either of two channels. In the embodiment of FIG. 1, the error detecting circuit can have another arrangement.

Figure 4:
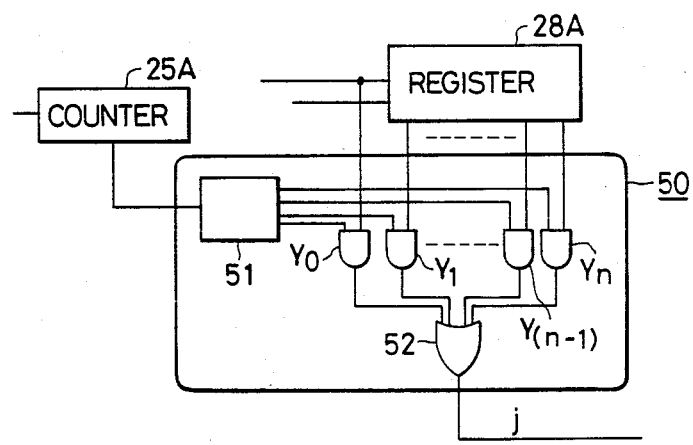
FIG. 4 is a block diagram of another embodiment of a change-over switch shown in FIG. 1.

Another embodiment of the change-over switch is shown in FIG. 4. This change-over switch 50 includes a decoder 51, AND gates $Y_0, Y_1, \ldots, Y_{n-1}$ and $Y_n$, and an OR gate 52. The decoder 51 is connected to the counter 25A. Further, the output side of the decoder 51 is connected to the respective AND gates $Y_0, Y_1, \ldots, Y_{(n-1)}$ and $Y_n$. The AND gate $Y_0$ is connected with a path for holding the transmitter 1A and the register 28A in communication, in a manner to bypass this register. The other AND gates $Y_1-Y_n$ are connected to the register 28A. The output sides of the AND gates $Y_0, Y_1, \ldots$ and $Y_n$ are connected to the OR gate 52. While the case of employing the change-over switch 50 instead of the change-over switch 31A in FIG. 1, has been described, the change-over switches 31B and 31C in FIG. 1 can be similarly replaced with such change-over switches 50.

The decoder 51 selects a predetermined one of the AND gates in the change-over switch 50 on the basis of the number of pulses being the output of the counter 25A. Assuming that the same signals as in FIG. 1 are transmitted from the respective transmitters, then the AND gate $Y_3$ is enabled in the change-over switch 50 connected to the register 28A, and AND gate $Y_0$ in the change-over switch 50 connected to the register 28B, and the AND gate $Y_1$ in the change-over switch 50 connected to the register 28C. Consequently, the signals (j), (k) and (l) in FIG. 3 are provided from the respective change-over switches 50.

According to the present invention, the error of a transmission signal in a multiple information system can be detected in a short time.

What is claimed is:

1. In a signal diagnostic apparatus for a multiple transmission system having first, second and third transmission means arranged in parallel to transmit transmission signals each having a synchronizing signal part and an information signal part; first, second and third reception means to receive the transmission signals provided from the first, second and third transmission means, respectively; and means to detect any error of the transmission signals by receiving the respective transmission signals provided from the first, second and third transmission means; a signal diagnostic apparatus for a multiple transmission system characterized by comprising means to receive said respective transmission signals provided from said first, second and third transmission means and to detect the transmission signal transmitted latest among these transmission signals; first means to detect the transmission time difference between said transmission signal provided from said first transmission means and said transmission signal transmitted latest; second means to detect the transmission time difference between said transmission signal provided from second transmission means and said transmission signal transmitted latest; third means to detect the transmission time difference between said transmission signal provided from said third transmission means and said transmission signal transmitted latest; first means to delay said transmission signal provided from said first transmission means, on the basis of an output signal from the first transmission time difference detecting means; second means to delay said transmission signal provided from said second transmission means, on the basis of an output signal from the second transmission time difference detecting means; and third means to delay said transmission signal provided from said third transmission means, on the basis of an output signal from the third transmission time difference detecting means; the error detection means detecting the error by comparing said respective transmission signals provided from the first, second and third delay means.

2. A signal diagnostic apparatus for a multiple transmission system as defined in claim 1, wherein said first, second and third delay means include means to receive and store the transmission signals, and means to adjust the time at which the stored transmission signals are fetched from the storage means, on the basis of said transmission time differences.

3. A signal diagnostic apparatus for a multiple transmission system as defined in claim 2, wherein said storage means consists of registers, and the time adjusting means consists of change-over switches.

4. A signal diagnostic apparatus for a multiple transmission system as defined in claim 1 or 3, wherein said means to detect said transmission signal transmitted latest is a NAND gate.

5. A signal diagnostic apparatus for a multiple transmission system as defined in claim 1 or 3, wherein said first, second and third time difference detecting means include AND gates which receive the output signals of said transmission means and said means to detect said transmission signal transmitted latest, and means to detect the numbers of pulses of output signals from said AND gates.

6. A signal diagnostic apparatus for a multiple transmission system as defined in claim 5, comprising a clock signal generator which supplies a clock signal to the respective AND gates of said first, second and third time difference detecting means.

7. A signal diagnostic apparatus for a multiple transmission system as defined in claim 2, wherein said means to detect said transmission signal transmitted latest is a NAND gate.

8. A signal diagnostic apparatus for a multiple transmission system as defined in claim 7, wherein said first, second and third time difference detecting means includes AND gates which receive the output signals of said transmission means and said means to detect said transmission signal transmitted latest, and means to detect numbers of pulses of output signals from said AND gates.

9. A signal diagnostic apparatus for a multiple transmission system as defined in claim 8, comprising a clock signal generator which supplies a clock signal to the respective AND gates of said first, second and third time difference detecting means.

* * * * *